(12) United States Patent
Stephenson et al.

(10) Patent No.: US 7,129,911 B2
(45) Date of Patent: Oct. 31, 2006

(54) SEGMENTED DISPLAY HAVING UNIFORM OPTICAL PROPERTIES

(75) Inventors: Stanley W. Stephenson, Spencerport, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 488 days.

(21) Appl. No.: 10/672,799

(22) Filed: Sep. 26, 2003

(65) Prior Publication Data
US 2005/0068257 A1    Mar. 31, 2005

(51) Int. Cl.
*G09G 3/04*    (2006.01)
(52) U.S. Cl. .............. 345/33; 345/34; 345/35
(58) Field of Classification Search ........... 345/33, 345/34, 55
See application file for complete search history.

(56) References Cited
U.S. PATENT DOCUMENTS

| | | |
|---|---|---|
| 3,816,786 A | 6/1974 | Churchill et al. |
| 4,435,047 A | 3/1984 | Fergason |
| 5,636,044 A | 6/1997 | Yuan et al. |
| 6,618,113 B1 * | 9/2003 | Ulrich et al. ............ 349/156 |
| 6,947,114 B1 * | 9/2005 | Yamada et al. ............ 349/129 |

* cited by examiner

*Primary Examiner*—Richard Hjerpe
*Assistant Examiner*—Leonid Shapiro
(74) *Attorney, Agent, or Firm*—Chris P. Konkol

(57) ABSTRACT

A display comprising:
a) a substrate;
b) first transparent conductors;
d) second conductors patterned to form segments;
e) inter-segment material disposed between said second conductors, electrically conductive and having optical properties similar to said second conductors;
f) an imaging layer comprising a light-modulating material disposed between said first and second conductors, electrically switched between two field-stable optical states and having a third as-coated optical state; and
g) applying an electrical field to said inter-segment material and said first conductors to write said light-modulating material from the as-coated optical state to a different optical state more closely matching one of the two field-stable optical states.

30 Claims, 9 Drawing Sheets

SEGMENTED DISPLAY HAVING UNIFORM OPTICAL PROPERTIES

FIELD OF THE INVENTION

The present invention relates to segmented cholesteric (chiral nematic) liquid crystal displays.

BACKGROUND OF THE INVENTION

Currently, information is displayed using assembled sheets of paper carrying permanent inks or displayed on electronically modulated surfaces such as cathode ray displays or liquid crystal displays. Printed information cannot be changed. Electrically updated displays are often heavy and expensive. Other sheet materials can carry magnetically written areas, for example, to carry ticketing or financial information. Such magnetically written data, however, is not visible.

Media systems exist that maintain electronically changeable data without power. Such system can be electrophoretic (Eink), Gyricon, or polymer dispersed cholesteric materials. An example of such electronically updateable displays can be found in U.S. Pat. No. 3,600,060 issued Aug. 17, 1971 to Churchill et al., which patent shows a device having a coated, then dried emulsion of cholesteric liquid crystals in aqueous gelatin to form a field-responsive, bistable display. U.S. Pat. No. 3,816,786 also to Churchill et al. discloses a layer of encapsulated cholesteric liquid crystal responsive to an electric field. The electrodes in the patent can be transparent or non-transparent and formed of various metals or graphite. It is disclosed that one electrode must be light absorbing, and it is suggested that the light absorbing electrode be prepared from paints contains conductive material such as carbon.

Fabrication of flexible, electronically written display sheets is disclosed in U.S. Pat. No. 4,435,047 issued Mar. 6, 1984 to Fergason. A substrate supports a first conductive electrode, one or more layers of encapsulated liquid crystals, and a second electrode of electrically conductive ink. The conductive inks form a background for absorbing light, so that the information-bearing display areas appear dark in contrast to background non-display areas. Electrical potential applied to opposing conductive areas operates on the liquid crystal material to expose display areas. Because the liquid crystal material is nematic liquid crystal, the display ceases to present an image when de-energized, that is, in the absence of a field. The patent discloses the use of dyes in either the polymer encapsulant or liquid crystal to absorb incident light. The patent further discloses the use of a chiral dopant. The dopant improves the response time of the nematic liquid crystal, but does not cause the nematic host to operate in a bistable light-reflective state.

U.S. Pat. No. 5,251,048 to Doane et al. discloses a light-modulating cell having a polymer-dispersed chiral-nematic liquid crystal. The chiral-nematic liquid crystal has the property of being electrically driven between a planar state, reflecting a specific visible wavelength of light, and a focal-conic state, transmitting forward scattering light. Chiral-nematic liquid crystals, also known as cholesteric liquid crystals, potentially in some circumstances have the capacity of maintaining one of multiple given states in the absence of an electric field. Black paint can be applied to the outer surface of a rear substrate to provide a light-absorbing layer forming a non-changing background outside of a changeable display area defined by the intersection of segment lines and scanning lines.

U.S. Pat. No. 5,636,044 to Yuan et al. discloses a seven-segment display, using cholesteric liquid-crystal material, which display has two substrates. The substrates are rigid glass with patterned transparent electrodes on each of two facing surfaces. A continuum of cholesteric liquid crystal fills the gap between the two electrode sets. The first substrate is divided into segmented and non-segmented areas which are defined by gaps in transparent, electrically conductive Indium-Tin-Oxide (ITO) disposed on the substrate. The second substrate is divided into common electrodes in an ITO coating corresponding to segmented and non-segmented areas on the first substrate. The device can change the state of the segmented areas as well as non-segmented areas, permitting the display of a positive or negative image. Both electrodes are transparent electrodes, requiring an additional light-absorbing layer on the back of one substrate. Inter-segment material, or gaps in the electrode materials, requires electrode contacts to each segment area to write; requiring separate electrical connection to each segment area. It would be useful to have a structure that could provide simple electrode connect to each segment area, in a matrix fashion, without requiring point connection to each segment area.

U.S. Pat. No. 6,236,442 to Stephenson et al. discloses a display sheet with a metallic conductive layer over a cholesteric layer. A process is disclosed for vacuum depositing a continuous metallic layer and laser patterning the metallic layer to form segment electrodes. Moralized areas remain between electrically driven areas. However, those areas between etched segments remain in an as-coated state. A circuit board with contacts is pressed against each segment electrode. The circuit board provides electrical drive to segment electrodes.

U.S. Pat. No. 6,394,870 to Petruchik et al discloses an opaque conductive material with non-conductive areas to delineate images stored in polymer-dispersed cholesteric liquid crystal. The patent discloses printing the opaque conductive material, and providing contact to each image-bearing area. No conductive material is provided between segments. In one embodiment, a dielectric area with openings to each opaque conductive area is printed over the opaque conductive material. Traces are then printed over the dielectric layer to eliminate a circuit board with contacts. Areas between etched segments remain in an as-coated state.

There is a need for a display using polymer-dispersed cholesteric liquid crystals having background material with optical properties matching optical properties of the written segments.

SUMMARY OF THE INVENTION

The need is met according to the present invention by a display having a display driver and a display area capable of displaying a plurality of characters, each character having a character region and a background region, wherein each character region comprises a plurality of segments, said display comprising:

a) a substrate;

b) transparent first conductors, wherein said character region corresponds to at least one of the first conductors, c) second conductors patterned to have electrically separate areas corresponding to the segments of the character region;

d) at least one imaging layer comprising a light modulating material disposed between said first and second conductors, which material has the property of having a first and second field-switchable stable optical state which states correspond, respectively, to a first and second contrasting optically visible state, and which material has the further property, when coated on a substrate and before application of a electromagnetic field, of exhibiting an initial state or optical appearance (as-coated or as-fabricated prior to exposure to a field to change its optical state) that is nearer to the first optically visible state (for example, a reflective state in a liquid-crystal display) and, after being subjected to a field (such as capable of switching from the second visible state to the first visible state) of exhibiting a field-induced optical appearance (for example, the reflective state corresponding to a planar orientation in a liquid-crystal material) and e) an inter-segment background element, corresponding to the background region, comprising one or more sections, said background element and said second conductors being substantially level with each other (e.g., in the same layer], and which background element is disposed outside the peripheral boundary of the patterned areas of said second conductors, which background element comprises a material that is electrically conductive such that during manufacture it is capable of electrically writing the background region into one of the optically visible states (which background element may be patterned to have electrically separate areas);

f) third conductors connected to second conductors in more than one character region;

wherein the display is arranged such that, during use, the background element cannot be used to electrically write the background region into one of the optically visible states employing a display driver and/or using third conductors.

In one embodiment, a polymer-dispersed cholesteric liquid-crystal display comprising:

a) a substrate;

b) first transparent conductors;

c) second conductors having preselected optical properties patterned to form segments;

d) inter-segment material disposed between and/or around said second conductors, electrically conductive and having optical properties preselected to substantially match those of said second conductors, but which inter-segment material is electrically isolated from the second conductors (e.g. separated by a narrow gap);

e) a coated polymer-dispersed cholesteric liquid crystal layer disposed between said first and second conductors, electrically switchable between two field-stable optical states and also having a third as-coated optical state that is substantially closer to one of the two field-stable states than the other;

wherein the display is adapted, during its intended display use, for applying an electrical field to said first conductors, employing a display driver, in order to write said polymer-dispersed material from either one of the two-field stable optical states to the other of the two field-stable states, thereby displaying an image (for example, a picture, symbol, digit, letter, or other information-bearing or ornamental data intended for human perception); and wherein the display is not adapted, during its intended display use, for applying an electrical field to said inter-segment material employing the display driver connected during display use.

In one embodiment, an electric field has been applied to said inter-segment material during manufacture of the display in order to write a corresponding polymer-dispersed liquid crystal material from its as-coated optical state to one of the two field-stable optical states corresponding to optical state of the background region of the display during use.

The present invention is also directed to a method of making a display, one embodiment of which comprises the steps of:

a) providing a substrate;

b) forming a first patterned conductor layer on the substrate having electrically separate areas defining character regions;

c) depositing a layer of light modulating material over the first patterned conductor layer;

d) forming a second patterned conductor layer over the layer of light modulating material and having electrically separate areas defining the segments of the characters and the background;

e) forming inter-segment background conductors at substantially the same horizontal level as the second patterned conductor layer over the layer of light modulating material and having electrically separate areas defining the background;

f) optionally depositing a dielectric layer over the second patterned conductor layer, the dielectric layer defining holes over each segment; and f) forming a third patterned conductor layer defining a plurality of conductors connected to the areas defining the character segments in the second patterned conductor; at least one of the conductors being connected to a segment in more than one character, whereby the display may be addressed in a matrix fashion by electrically addressing the first and second patterned conductors;

g) employing the inter-segment background conductors to electrically change the as-coated or heated light-modulating material controlled by said conductors to one of two contrasting optical states;

connecting the display to a driver capable of addressing the display in a matrix fashion by electrically addressing, via electrical contact with the conductors in the third patterned conductor layer, the first and second patterned conductor layers, but wherein the inter-segment background conductors defining background is not electrically addressable by the driver via electrical contact with the conductors in the third patterned conductor layer.

A voltage can be applied to the background element before application of a dielectric layer or a spaced circuit board, and voltage can be applied to the background element alone or to the entire display. As indicated above, a preferred embodiment involves electrically writing the background of the display, or manufacturing intermediate thereof, in a reflective or planar optical mode once before sale or commercial use of the display. However, another option, prior to step (g) of the method, the display may be heated to convert the light-modulating material controlled by the background conductors to a dark optical state. In such as option, one embodiment involves the manufacture of a display in which a liquid-crystal material is in the focal-conic or darker optical state in the background region of the region.

ADVANTAGES

The invention has the advantage that inter-segment areas in a display provide an improved optical match with at least of the optical modes of switched segments.

DETAILED DESCRIPTION OF THE PREFERRED EMBODIMENT

Figure 1:
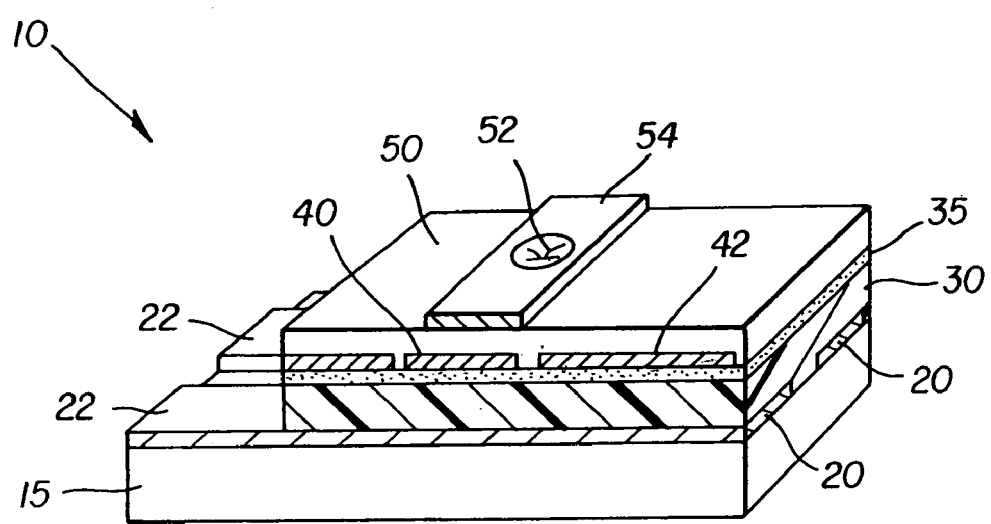
FIG. 1 is a perspective of one embodiment of a display in accordance with the present invention, in which a polymer-dispersed liquid crystal-material is used.

FIG. 1 is a perspective section view of one preferred embodiment of a display in accordance with the invention, which display employs a polymer-dispersed cholesteric material. A sheet designated as display 10 is made in accordance with the present invention. Display 10 includes a display substrate 15, which can be a thin transparent polymeric material, such as Kodak Estar® film base formed of polyester plastic that has a thickness of between 20 and 200 micrometers. In an exemplary embodiment, display substrate 15 is a 125-micrometer thick sheet of polyester film base. Other polymers, such as transparent polycarbonate, can also be used.

One or more first transparent conductors 20 are formed on display substrate 15. First transparent conductors 20 can be tin-oxide, indium-tin-oxide (ITO), or polythiophene, with ITO being the preferred material. Typically the material of first transparent conductors 20 is sputtered or coated as a layer over display substrate 15 having a resistance of less than 1000 ohms per square. First transparent conductors 20 can be formed in the conductive layer by conventional lithographic or laser etching means. Transparent first transparent conductors 20 can also be formed by printing a transparent organic conductor such as PEDT/PSS, PEDOT/PSS polymer, which materials are sold as Baytron® P by Bayer AG Electronic Chemicals. Portions of first transparent conductors 20 can be uncoated to provide exposed first conductors 22 for this embodiment.

Cholesteric layer 30 overlays first transparent conductors 20. Cholesteric layer 30 contains cholesteric liquid-crystal material, such as those disclosed in U.S. Pat. No. 5,695,682 to Doane et al., the disclosure of which is incorporated by reference. Such materials are made using highly anisotropic nematic liquid crystal mixtures and adding a chiral doping agent to provide helical twist in the planes of the liquid crystal to the point that interference patterns are created that reflect incident light. Application of electrical fields of various intensity and duration can be employed to drive a chiral-nematic (cholesteric) material into a reflective state, to near-transparent or transmissive state, or an intermediate state. These materials have the advantage of having first and second optical states that are both stable in the absence of an electrical field. The materials can maintain a given optical state indefinitely after the field is removed. Cholesteric liquid crystal materials can be formed, for example, using a two-component system such as MDA-00-1444 (undoped nematic) and MDA-00-4042 (nematic with high chiral dopant concentrations) available from E. M. Industries of Hawthorne, N.Y.

In a preferred embodiment, cholesteric layer 30 is a cholesteric material dispersed in deionized photographic gelatin. The liquid crystal material is mixed at 8% cholesteric liquid crystal in a 5% gelatin aqueous solution. The mixture is dispersed to create an emulsion having 8–10 micrometer diameter domains of the liquid crystal in aqueous suspension. The domains can be formed using the limited coalescence technique described in U.S. Pat. No. 6,423,368 by Stephenson et al. The emulsion is coated over first transparent conductors 20 on a polyester display substrate 15 and dried to provide an approximately 9-micrometer thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sub-layer can be applied over first transparent conductors 20 prior to applying cholesteric layer 30 as disclosed in U.S. Pat. No. 6,423,368 by Stephenson et al., hereby incorporated by reference in its entirety.

Figure 2:
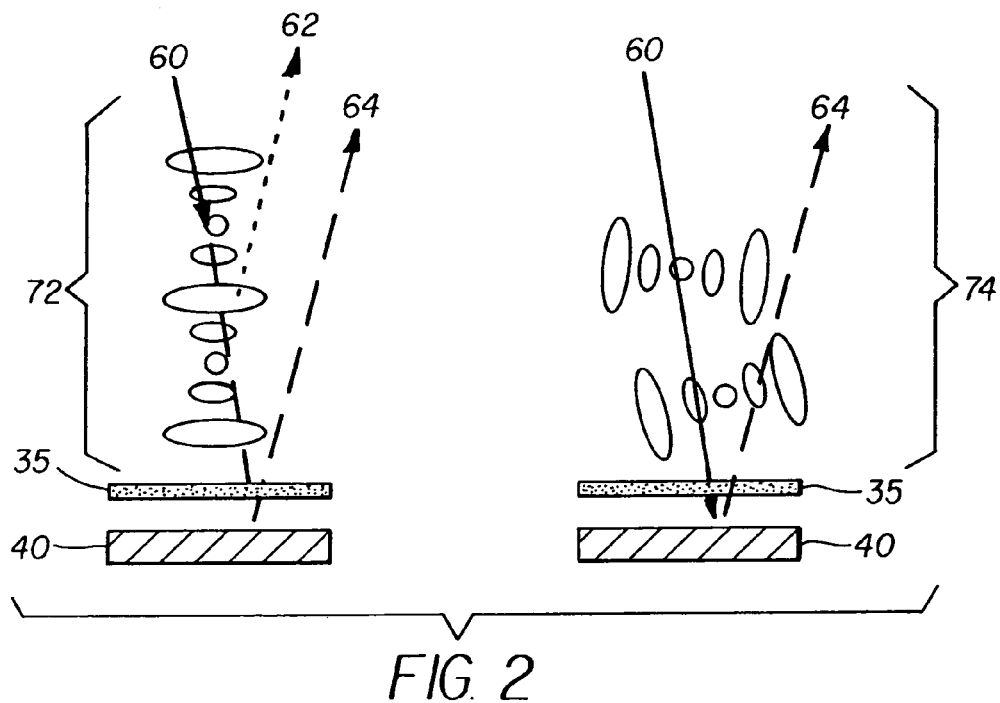
FIG. 2 is a schematic sectional view of a chiral nematic material, respectively, in a planar and focal-conic state responding to incident light.

FIG. 2 is a schematic section view of optical states of one embodiment of a display in accordance with the present invention. The left diagram demonstrates the optical path when the cholesteric material is in a planar state. Incident light 60 strikes planar liquid crystal 72 which reflects a portion of incident light 60 as reflected light 62. The remaining light passes through dark layer 35.

Dark layer 35 can be a complementary light-absorbing dye layer that operates on a portion of the light passing though dark layer 35. Particular wavelengths of light are absorbed, and the remaining light strikes reflective second conductor 40. Light is reflected from second conductor 40 and passes through dark layer 35 a second time, then passes through planar material 72 to become complementary light 64. Complementary light 64, operating in conjunction with cholesteric liquid crystal having peak reflectance near 575 nanometers, forms a substantially color-neutral reflective surface.

On the right side of FIG. 2, the liquid-crystal material is in a focal-conic state 74 and transmits incident light 60. Dark layer 35 provides complementary light 64 when the liquid crystal material is in a focal conic state. As one alternative, dark layer 35 can be a thin, black layer that absorbs across all wavelengths of light. With a black dark layer 35, when the cholesteric material is in the focal-conic state, the image will be essentially black.

Figure 3:
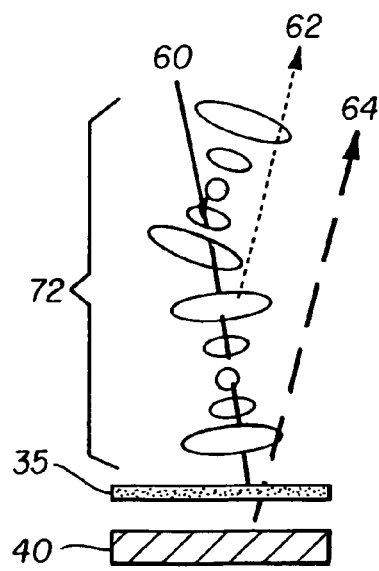
FIG. 3 is a schematic sectional view of an as-coated chiral nematic material responding to incident light.

FIG. 3 is a schematic sectional view of an as-coated chiral nematic material responding to incident light. Polymer-dispersed cholesteric material as-coated assumes a near-planar state ("nP") which is less reflecting compared to the planar state obtained by an electrical field, in an area of an image or other information formed during display use. The amount of reflected light 62 is less. The cholesteric material is bright but does not match the reflectance of the cholesteric material when it is electronically written into the planar state.

Figure 4:
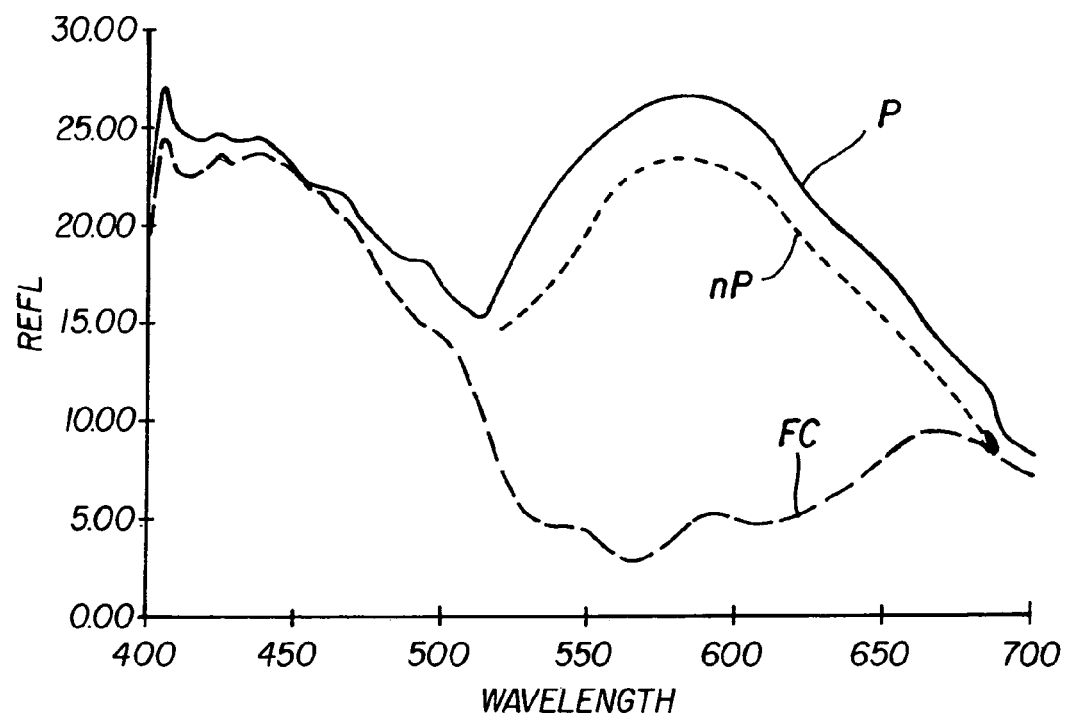
FIG. 4 is a plot of the spectra for a polymer-dispersed liquid-crystal material in the planar, focal-conic, and near-planar states.

FIG. 4 is a plot of the spectra for a yellow polymer-dispersed cholesteric liquid-crystal material with a blue dark layer in the planar (P), focal-conic (FC) and near-planar (nP) state. When the cholesteric material is in the planar state, the display appears substantially color neutral. When the display is written into the focal-conic state, the display appears blue. In the as-coated, electrically unwritten near planar (nP) state, the display does not have the full reflectance of the planar (P) state and has an appearance different from an electrically written planar state. Displays that do not electrically activate the full surface area, such as seven-segment displays, will have characters in optical states that do not match the background state. Similarly, in the case that dark layer is black, the as-coated state in the near-planar (nP) will also differ from the reflectance of polymer-dispersed cholesteric liquid-crystal material electrically written into the planar state. It should also be recognized that although, in FIG. 4, the spectra for a polymer-dispersed cholesteric liquid-crystal material in the near-planar (nP) state is below the spectra of the material in the planar (P) state, the point of significance is that the two spectra do not match well and, for example, the spectra of the material in the near-planar (nP) state could be above the spectra of the material in the planar (P) in other embodiments.

Thus, based on FIG. 4, the skilled artisan will appreciate that any regions in a display having as-coated chiral nematic material will not match well the regions in a display having chiral nematic material exhibiting optical states obtained during display use, a problem described in U.S. Pat. No. 5,636,044 to Yuan et al., hereby incorporated by reference in its entirety. The skilled artisan will also recognize that a chiral-nematic material can provide a gray scale in which case the optical states referred to in this application preferably correspond to lightest and darkest contrasting states.

Returning to FIG. 1, dark layer 35 overlays cholesteric layer 30. In a preferred embodiment, dark layer 35 is a complementary light-absorbing layer composed of pigments that are milled below 1 micrometer to form "nano-pigments" in a binder. Such pigments are very effective in absorbing wavelengths of light in very thin (sub-micrometer) layers. Such pigments can be selected to be electrically inert to prevent degradation interference from electrical display fields applied to display 10. Such pigments are disclosed in copending U.S. patent application Ser. No. 09/624,333, hereby incorporated by reference.

In the present embodiment, in FIG. 1, dark layer 35 is coated over cholesteric layer 30 to provide a light-absorbing layer that provides a specific contrast state to reflected light. As mentioned above, dark layer 35 can be designed to provide a specific amount of light at wavelengths not operated on by the cholesteric liquid crystal to create a more color-neutral image. The coating can be simultaneous with the deposition of cholesteric layer 30 or as a separate step. In a preferred embodiment, multi-layer coating equipment of the kind used in the photographic industry provides cholesteric layer 30 and dark layer 35 as two co-deposited layers. Dark layer 35 is significantly thinner than cholesteric layer 30 and has minimal effect on the electrical field strength required to change the state of the cholesteric liquid-crystal material.

Second conductors 40 overlay dark layer 35. Second conductors 40 have sufficient conductivity to induce an electric field across cholesteric layer 30 strong enough to change the optical state of the polymeric material. Second conductors 40, especially for applications requiring complementary light 64, are preferably formed of reflective metal, for example, by vacuum deposition of conductive and reflective material such as aluminum, chrome or nickel. In the case of vacuum-coated second conductors 40, aluminum or silver provide very high reflectance and conductivity. The layer of conductive material can be patterned using well-known techniques such as photolithography, laser etching or by application through a mask.

In another embodiment, second conductors 40 can be formed by screen printing a reflective and conductive formulation such as UVAG® 0010 from Allied Photochemical of Kimball, Mich. Such screen printable conductive materials comprise finely divided silver in a ultraviolet-curable resin. After printing, the material is exposed to ultraviolet radiation greater than 0.40 Joules/cm$^2$, the resin will polymerize in 2 seconds to form a durable surface. Screen printing is preferred to minimize the cost of manufacturing the display. Alternatively, second conductors 40 can be formed by screen printing a thermally cured silver-bearing resin. An example of such a material is Acheson Electrodag® 461SS, a heat cured silver ink. In the case that the dark layer 35 is black, any type of conductor can be used including black carbon in a binder.

The present invention is applicable to displays 10 in FIG. 1, which display has significant or sufficiently large areas between second conductors 40. In accordance with this invention, areas between second conductors 40 are filled with inter-segment material 42. Inter-segment material 42 is preferably formed with electrically conductive material that provides essentially the same optical properties as the material used in second conductors 40, that is, so that the inter-segment material 42 and the second conductors 40 provide the same appearance in the display. In the case of a vacuum-coated second conductor 40, a continuous metallic layer can be deposited and a laser used to delineate second conductors 40. Vacuum-deposited material outside second conductors 40 is retained as inter-segment material 42 in the laser etching process. In the case of printed second conductors 40, material can be printed in areas between second conductors 40 to create inter-segment material 42. In any case, it is desirable that inter-segment material 42 be electrically isolated from second conductors 40 to prevent fields applied to second conductors 40 during display use from activating inter-segment material 42. In the printed as-coated state, cholesteric liquid-crystal material adjacent to inter-segment material 42 is in the near planar (nP) state and appears to be a different color than the material written into either the planar or focal-conic state.

Referring still to the embodiment of FIG. 1, a dielectric layer 50 can be provided over second conductors 40. Dielectric layer 50 is provided with "through via" 52 that permit interconnection between second conductor 40 and conductive row contacts 54. Dielectric layer 50 can be formed, for example, by printing or coating a polymer such as vinyl dissolved in a solvent. Row contacts 54 can be formed by screen printing the same screen-printable, electrically conductive material used to form second conductors 40. The row contacts 54 (better seen in FIG. 13) enable the connection of common segments in different characters, thereby creating functional rows of electrically addressable areas in the polymer-dispersed cholesteric liquid-crystal layer. The row contacts and exposed first conductors 22 form a set of backside display contacts that are used to electrically address the display.

The use of: a flexible support for display substrate 15; thin first transparent conductors 20; machine-coated cholesteric liquid-crystal layer 30; and printed second conductors 40 permits the fabrication of a low-cost flexible display. Small displays according to the present invention can be used as electronically rewritable tags or labels for inexpensive, rewrite applications.

Figure 5:
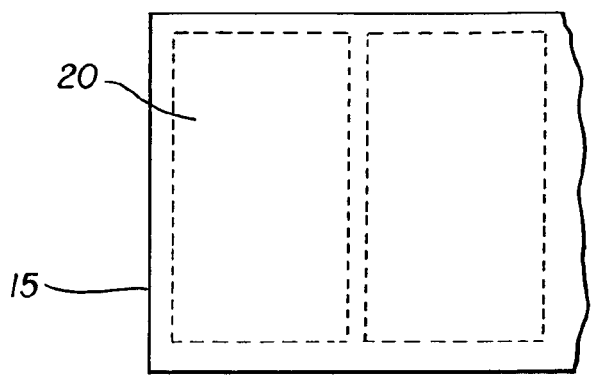
FIG. 5 is a rear view of a sheet in accordance with the present invention having a patterned first conductor.
Figure 6:
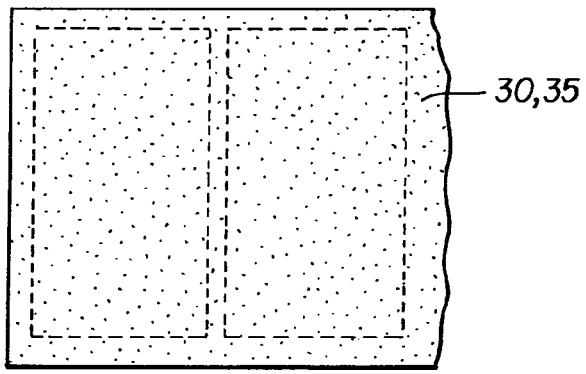
FIG. 6 is a rear view of a sheet in accordance with the present invention having a polymer-dispersed cholesteric liquid-crystal layer and a dark layer.
Figure 7:
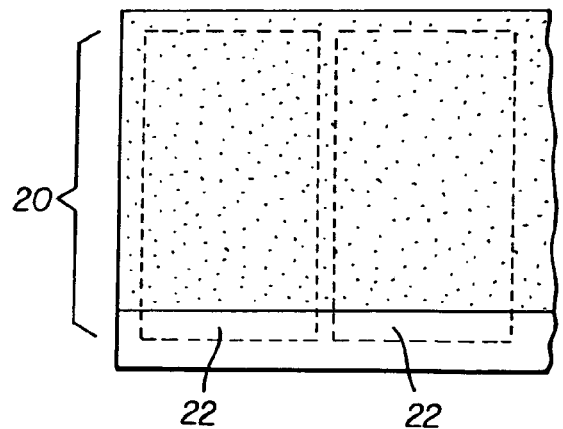
FIG. 7 is a rear view of a sheet in accordance with the present invention having exposed first conductors.

A process for fabricating display 10 will now be described. FIG. 5 is a rear view of a sheet in accordance with the one embodiment of the present invention, which sheet has a patterned first conductor. A substrate 15 is provided with a plurality of patterned first transparent conductors 20. FIG. 6 is a rear view of a sheet in accordance with the present invention having a polymer-dispersed cholesteric liquid-crystal layer and a dark layer 30, 35 (only the top layer is viewable). In a preferred embodiment, cholesteric layer 30 and dark layer 35 are co-deposited. FIG. 7 is a rear view of a sheet in accordance with the present invention having exposed first conductors. Portions of cholesteric layer 30 and dark layer 35 can be removed, for example, using a solvent to form exposed first conductors 22.

Figure 8A:
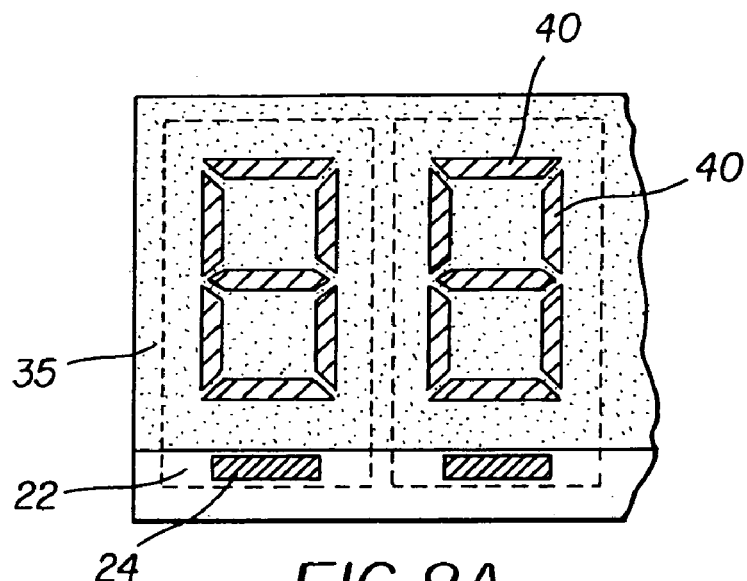
FIG. 8A is a rear view of a display in accordance with prior art having second conductors.
Figure 8B:
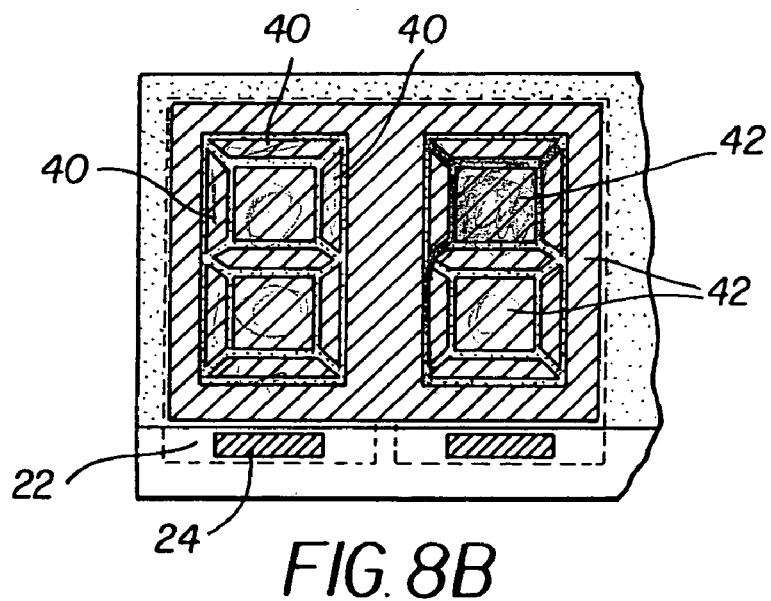
FIG. 8B is a rear view of a display in accordance with the present invention having second conductors and conductive inter-segment material between second conductors.

FIG. 8A is a rear view of a display in accordance with prior art having second conductors, which second conductors 40 have been printed over dark layer 35. Printing portions of the same material used to create second conductors 40 over exposed first transparent conductors 20 can provide protective covering 24 over exposed first conductor 22. FIG. 8B is a rear view of a display in accordance with the present invention having second conductors 40 and conductive inter-segment material 42 between second conductors 40. Preferably, printed material is provided in substantially or essentially all display areas not covered by second conductors 40. In the embodiment of FIG. 8B, however, there is a relatively thin gap between inter-segment material 42 and second conductors 40 so they are conductively isolated. A pattern of second conductors 40 and inter-segment material 42 can also be formed by applying a continuous vacuum coated metal, and laser etching separated second conductors from inter-segment material 42.

Figure 9:
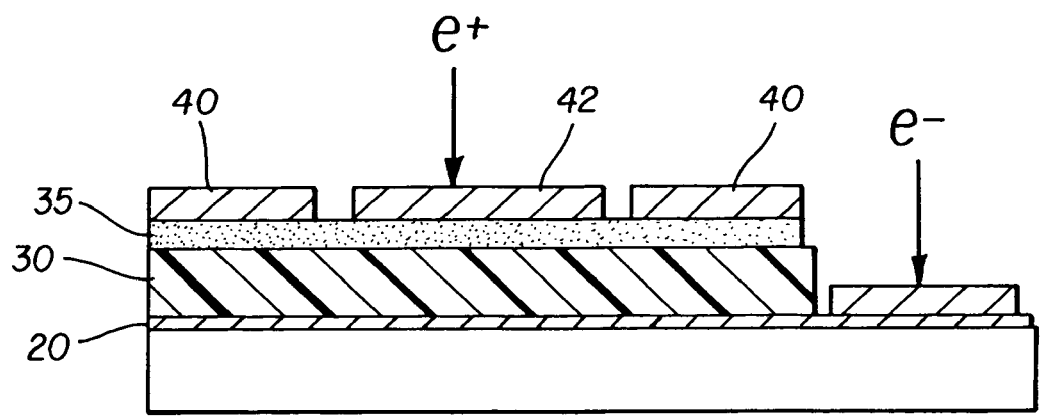
FIG. 9 is a sectional side view of a display in accordance with the present invention having an electrical field applied to inter-segment material.

FIG. 9 is a sectional side view of a display in accordance with the present invention showing diagrammatically an electrical field being applied to inter-segment material 42 and, hence (through dark layer 35) to the cholesteric liquid crystal material 30 between the inter-segment material 42 and the first conductor 20. This can occur during manufacture prior to coating of a dielectric layer or may occur, afterwards. The electrical field can be applied on-line during manufacture only to the inter-segment material or to both the inter-segment material and the segment material. The electric field may be applied by contact with a voltage source or by introduction of the display in a sufficiently strong electromagnetic field. A tool can be designed by the skilled artisan that connects an electrical current to a point of contact for each electrically isolated intersegment-element in the display.

Figure 10:
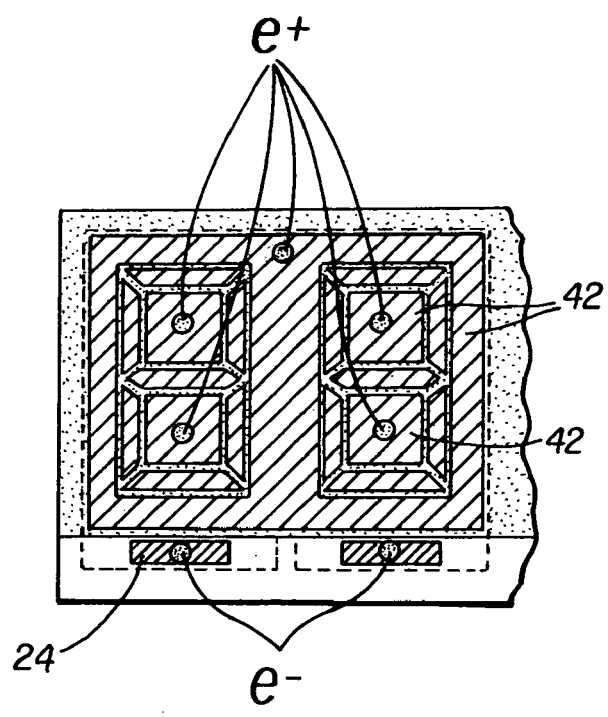
FIG. 10 is a rear view of a display in accordance with the present invention having an electric field applied to inter-segment material.

FIG. 10 is a rear view of a display (manufacturing intermediate) in accordance with the present invention showing points of contact for an electric field being applied to inter-segment material in a manufacturing intermediate of a display. An electrical field is be applied to inter-segment material 42 at this step of the manufacturing process to convert cholesteric liquid-crystal material covered by inter-segment material 42 from near-planar (nP) to an electrically written planar (P) state. After conversion of cholesteric material under inter-segment material 42 to an electrically written state, display 10 can be completed.

Figure 11:
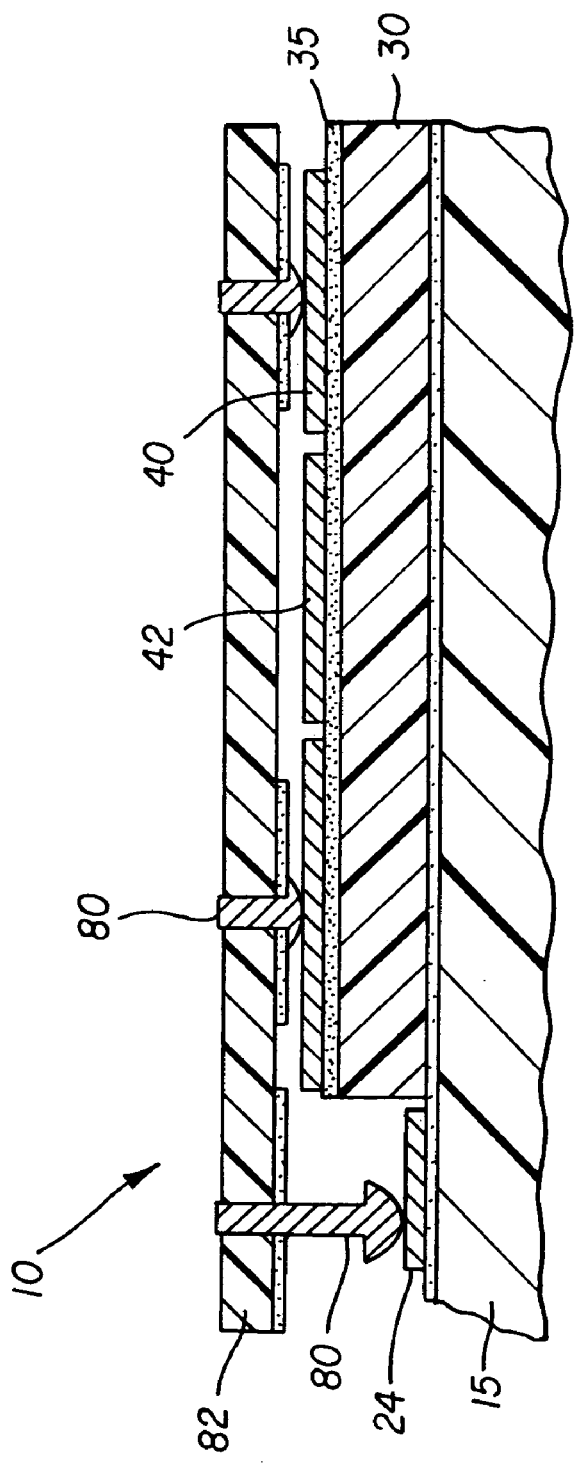
FIG. 11 is a section view of a display in accordance with the present invention attached to a circuit board.

FIG. 11 is a sectional view of one embodiment of a display 10 comprising a substrate 15 and dark layer 35 in accordance with the present invention in which the display comprises a circuit board attached to the assembly of FIG. 10. Contacts 80 on circuit board 82 provide electrical connection to each second conductor 40 and protective covering 24 over a first conductor in accordance with prior art, as will be understood by the skilled artisan. Instead of coating a dielectric layer, air may be used as a dielectric material in combination with suitable spacing achieved by contacts 80.

Figure 12:
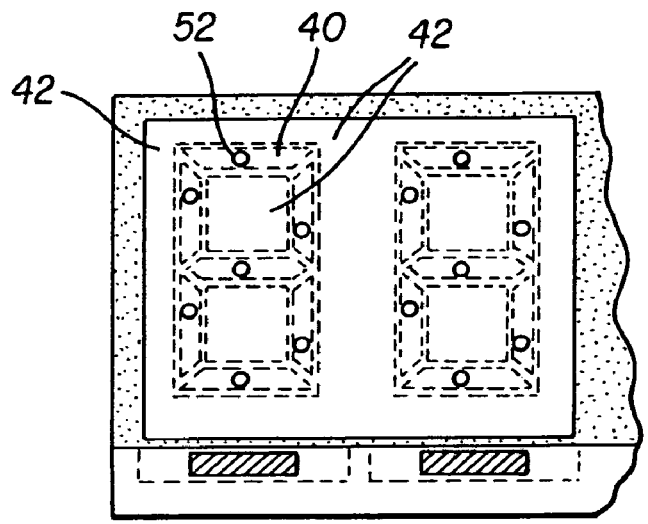
FIG. 12 is a rear view of a display in accordance with the present invention having an applied dielectric area.

Circuit board 82 of display 10 can be replaced with additional printed layers to form a matrix drive for seven segment displays. FIG. 12 is a rear view of a display in accordance with the present invention having an applied dielectric layer 50. Dielectric layer 50 covers both second conductors 40 and inter-segment material 42. Through via 52 permit access to second conductors 40. Alternatively, through via 52 can furthermore permit connection to inter-segment material 42 to permit writing of cholesteric liquid-crystal material to either the focal-conic or planar state during manufacture or prior to display use. Design of multiple printed layers to create a matrix driven seven segment display having electrically writable inter-segment material are incorporated in co-pending U.S. application Ser. No. 08/687,752 by the same inventors, which application is hereby incorporated by reference in its entirety.

A display employing dark images on a light background provides advantageous image quality. That configuration corresponds, in the embodiment of FIG. 1, to planar written background material with focal-conic characters. In a preferred embodiment, cholesteric liquid-crystal material below inter-segment material 42 is, accordingly, electrically written into the planar state. However, the present invention is not limited to such a configuration.

Figure 13:
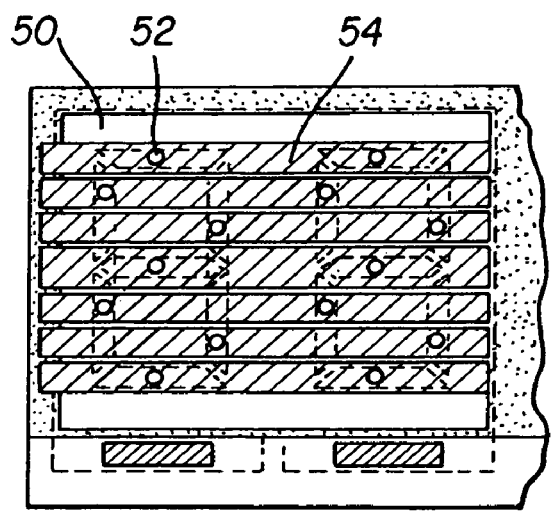
FIG. 13 is a rear view of a display in accordance with the present invention having row contacts.

FIG. 13 is a rear view of a display (manufacturing intermediate) in accordance with the present invention having row contacts 54. Row contacts 54 are conductive traces printed to connect common second conductors using through via 52 in dielectric layer 50.

Figure 14:
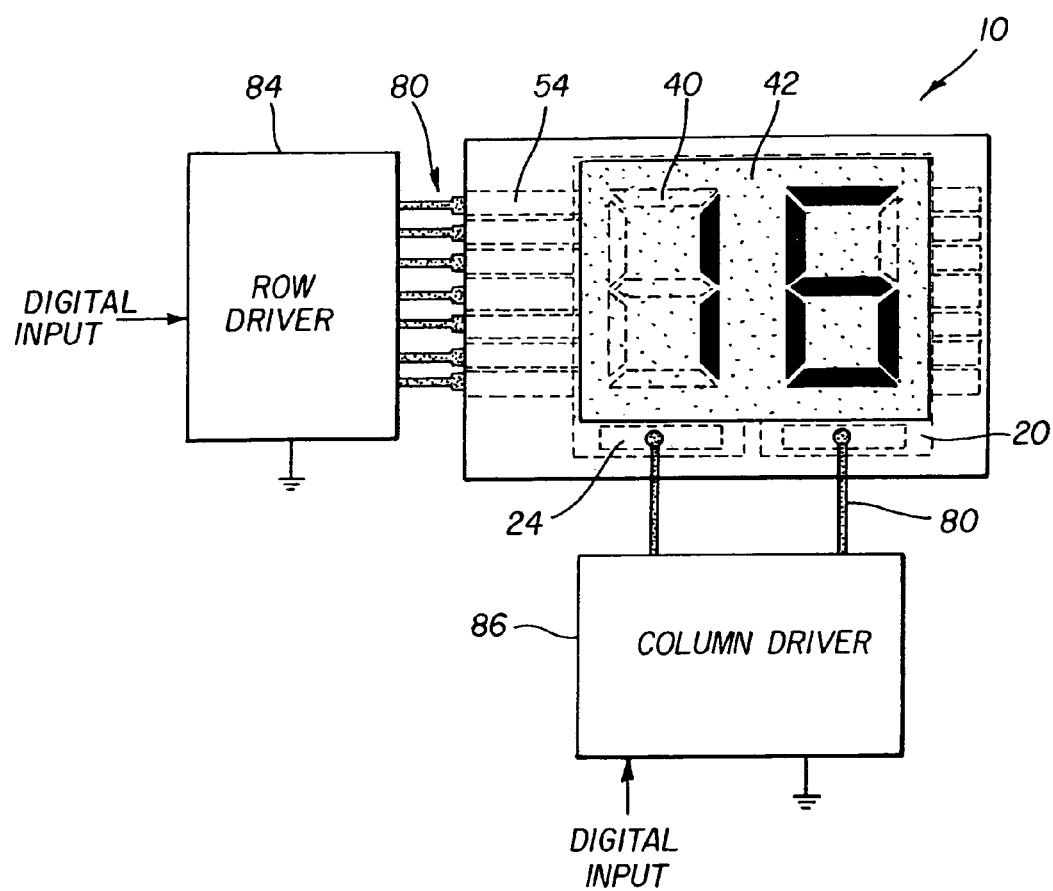
FIG. 14 is a front view of a display in accordance with the present invention connected to electric drive means.

FIG. 14 is one embodiment of a completed display in accordance with the present invention connected to an electric driver. Row driver 84 is connected by contacts 80 to row contacts 54. Column driver 86 is connected by contacts 80 to first transparent conductors 20 though protective covers 24. Electrical signals can be applied to row driver 84 and column driver 86 to write images onto display 10. Because inter-segment material 42 was used to write the material into the planar state, the display appears to have a continuous bright state. Segments of display 10 are written into the darker, focal-conic state to present image data. Writing data segments back into the electrically written planar state merges the previously written area into an optically continuous background.

EXAMPLE

In an experiment, an as-coated yellow cholesteric liquid-crystal material with a blue dark layer was printed with silver ink to form both second conductors and inter-segment material. A high voltage bipolar electrical field (e+, e−) was applied between each inter-segment area and associated one or more second conductors. Thus, the areas between segments were electrically written from a near-planar (nP) to a planar (P) state. The process was found to significantly improved the image quality of the completed displays.

The printing and inter-segment electrical writing process was repeated using a green cholesteric liquid-crystal material and a carbon-black dark layer. Electrical pulses converted green cholesteric liquid-crystal material from a near-planar (nP) to a substantially more fully planar (P) state, thereby matching the planar state of written segment electrodes. It was concluded that electrically pulsing polymer-dispersed cholesteric liquid-crystal material under inter-segment material converted the optical state to a state more closely matching the planar state of electrically written segment areas. The process, therefore, provided an improvement in display quality.

Another experiment was performed to determine the effect of electrically writing cholesteric liquid-crystal material in the inter-segment (background) areas into the planar and focal-conic states. When the cholesteric liquid-crystal material in the background was written into the focal-conic state, cholesteric liquid-crystal material between second conductors and inter-segment material remained in the near planar (nP) state. The resulting display accordingly had distinct bright borders around each segment between the inter-segment material and second conductor. Accordingly, the thinly narrow areas of near planar (nP) between second conductors and inter-segment material are close enough to the planar (P) state to be relatively unnoticeable when the inter-segment material is in the planar (P) state, but may be objectionable when inter-segment material is in the focal-conic (FC) state. In the as-coated state, therefore, the inter-segment material is preferably written into the planar (P) state.

Nevertheless, heating a display can convert a cholesteric liquid-crystal material into a near focal-conic state, but the displays will have an objectionable dark border when the background is written into the planar (P) state. In this case, then, because material between second conductors and inter-segment material is black, it is preferable that inter-segment material be written into the focal-conic state. Thus, when manufacturing a display in which the image or other information is positively displayed in the planar state and the background is in the focal-conic state or darker state, conversion by heat or otherwise of essentially or substantially all of the display, including the as-coated cholesteric liquid-crystal layer, into the focal-conic state preferably proceeds electrically writing the cholesteric liquid-crystal material in the background into the more pure of fully focal-conic state.

The invention has been described in detail with particular reference to certain preferred embodiments thereof, but it will be understood that variations and modifications can be effected within the spirit and scope of the invention.

PARTS LIST 10 display
15 display substrate
20 first transparent conductors
22 exposed first conductors
24 protective covering
30 cholesteric layer
35 dark layer
40 second conductors
42 inter-segment material
50 dielectric layer
52 through via
54 row contacts
60 incident light
62 reflected light
64 complementary light
72 planar liquid crystal
74 focal conic liquid crystal
80 contacts
82 circuit board
84 row driver
86 column driver
P Planar state
FC focal-conic state
nP near planar state

What is claimed is:

1. A display comprising:
   a) a substrate;
   b) transparent first conductors;
   c) second conductors forming conductive segments;
   d) a light modulating material disposed between said first and second conductors, having an initial state and different first and second field-changeable stable optical states;
   e) inter-segment conductive material disposed over areas of light modulating material not covered by second conductors, said conductive material having had an applied field to write the light-modulating material in said areas into a field-changed optical state;
   f) drive means connected to said first and second conductors and not to said inter-segment conductive material, said drive means operable to change the optical state of the light material to present an image on said display.

2. The display of claim 1 wherein the material for the inter-segment conductive material and the second conductors are common.

3. The display of claim 1 wherein material for the inter-segment conductive material is co-deposited in a layer with material for the second conductors.

4. The display of claim 1 wherein the inter-segment conductive material and the second conductors are opaque printed conductors.

5. The display of claim 1 wherein the inter-segment conductive material and second conductors are vacuum deposited.

6. The display of claim 1 wherein the light-modulating layer comprises liquid-crystal.

7. The display of claim 6 wherein said first field-changeable state is a reflective state and the liquid-crystal is essentially in a planar orientation.

8. The display of claim 6 wherein said liquid-crystal in the said areas is a background region of the display and is in a field-induced planar orientation providing a reflective state adapted to contrast with a display image in a relatively dark transmissive state.

9. The display of claim 1 wherein the light-modulating layer comprises polymer-dispersed domains of cholesteric liquid-crystal.

10. The display of claim 1 wherein between the first and second field-changeable stable optical states, the display is capable of providing a gray scale.

11. The display of claim 1 wherein the inter-segment conductive material is electrically separated from the second conductors.

12. The display of claim 11 wherein said inter-segment conductive material and said second conductors are electrically isolated by a thin and continuous region forming a narrow gap.

13. The display of claim 1 wherein the display is adapted to provide a bipolar electrical field across the first transparent conductors and second conductors.

14. The display of claim 1 further including:
   a) a dielectric layer having a through via to each second conductor; and
   b) conductive traces over the dielectric layer to interconnect selected second conductors, whereby the display may be addressed in a matrix fashion by electrically addressing the first and second plurality of contacts.

15. A display having a display driver and a display area capable of displaying a plurality of characters, each character having a character region and a background region, wherein each character region comprises a plurality of segments, said display comprising:
   a) a substrate;
   b) transparent first conductors, wherein said character region corresponds to at least one of the first conductors,
   c) second conductors patterned to have electrically separate areas corresponding to segments of the character region;
   d) at least one imaging layer comprising a light modulating material disposed between said first and second conductors, which material has the property of having a first and second field-switchable stable optical state which states correspond, respectively, to a first and second contrasting optically visible state, and which material has the further property, when coated on a substrate and before application of a electromagnetic field, of exhibiting an as-coated optical appearance that is near to the first visible state and, after being subjected to a field of exhibiting a field-induced optical appearance; and
   e) an inter-segment background element, corresponding to the background region, comprising one or more sections which may be patterned into separate areas in a character region, said background element and said second conductors covering different areas of the light-modulating layer, which background element comprises a material that is electrically conductive such that during manufacture it is capable of electrically writing the background region into one of the optically visible states;
   f) third conductors connected to second conductors in more than one character region;
   wherein the display is predesigned such that, during use, the background element cannot be used to electrically write the background region into one of the optically visible states employing a display driver and/or using third conductors.

16. A display having a display area capable of displaying a plurality of characters in a background, the characters including a plurality of segments, comprising:
   a) a first patterned conductor layer having electrically separate areas defining character regions;
   b) a layer of light modulating material located over the first patterned conductor layer;
   c) a second patterned conductor layer located over the layer of light modulating material and having electrically separate areas defining the segments of the characters;
   d) inter-segment background conductors located in the same layer as the second patterned conductor layer over the layer of light modulating material and having electrically separate areas defining the background;
   e) optionally a dielectric layer located over the second patterned conductor layer, the dielectric layer defining holes over at least each segment of the second patterned conductor layer;
   f) a third patterned conductor layer defining a plurality of conductors connected to the areas defining the character segments in the second patterned conductor; at least one of the conductors being connected to a segment in more than one character; and
   whereby the display may be addressed in a matrix fashion by electrically addressing, via electrical contact with the conductors in the third patterned conductor layer, the first and second patterned conductor layers, but wherein the inter-segment background conductors defining background is not electrically addressable via electrical contact with the conductors in the third patterned conductor layer.

17. The display of claim 16, wherein the background area is a single electrically connected area.

18. The display of claim 16, wherein the background area comprises a plurality of electrically separated areas that are electrically connected by a conductor in the third conductor layer.

19. The display of claim 16, wherein the light-modulating material comprises domains of chiral-nematic liquid crystal dispersed in a polymer matrix.

20. A method of making a display having a display area capable of displaying a plurality of characters in a background, the characters including a plurality of segments, comprising the steps of:
   a) providing a substrate;
   b) forming a first patterned conductor layer on the substrate having electrically separate areas defining character regions;
   c) depositing a layer of light-modulating material over the first patterned conductor layer;
   d) forming a second patterned conductor layer over the layer of light modulating material and having electrically separate areas defining the segments of the characters and the background;
   e) forming inter-segment background conductors located in the same layer as the second patterned conductor layer over the layer of light modulating material and having electrically separate areas defining the background;
   f) optionally depositing a dielectric layer over the second patterned conductor layer, the dielectric layer defining holes over each segment; and
   g) forming a third patterned conductor layer defining a plurality of conductors connected to the areas defining the character segments in the second patterned conductor; at least one of the conductors being connected to a segment in more than one character, whereby the display may be addressed in a matrix fashion by electrically addressing the first and second patterned conductors;
   h) employing the inter-segment background conductors to electrically change the as-coated or heated light-modulating material controlled by said conductors to one of two contrasting optical states;
   connecting the display to a driver capable of addressing the display in a matrix fashion by electrically addressing, via electrical contact with the conductors in the third patterned conductor layer, the first and second patterned conductor layers, but wherein the inter-segment background conductors defining background is not electrically addressable by the driver via electrical contact with the conductors in the third patterned conductor layer.

21. The method of claim 20 wherein a voltage is applied to the background element to create an electric field in a corresponding area of the light-modulating layer followed by deposition of a layer of a dielectric material.

22. The method of claim 21 wherein the voltage is applied to the entire all the conductors in the display area.

23. The method of claim 20 wherein prior to step (g) the display is heated to convert the light-modulating material controlled by the background element to a relatively dark optical state.

24. The method of claim 20, wherein the background area is a single electrically connected area.

25. The method of claim 20, wherein the background area comprises a plurality of electrically separated areas that are electrically connected by a conductor in the third conductor layer.

26. The method of claim 20 wherein the material for the inter-segment background conductors is co-deposited with the material for the second conductor layer.

27. The method of claim 20 wherein the light-modulating material is a cholesteric liquid-crystal material that is coated over a substrate or underlayer.

28. The method of claim 27 wherein, in step (g), the inter-segment background conductors writes the as-coated cholesteric material into a planar reflective state.

29. The method of claim 27 wherein, prior to step (g), the cholesteric material in the display is heated to convert it into a relatively dark near focal-conic state and, in step (g), an electrical field is applied across the transparent first conductors and inter-segment background conductors to write the converted cholesteric material into a more pure focal-conic state.

30. The method of claim 27 wherein in step (g), the cholesteric liquid crystal material in at least the areas of the display under the control of the inter-segment background conductors are subjected to an electric field to induce a planar reflective state.

* * * * *